US006606895B2

(12) United States Patent
Sanada et al.

(10) Patent No.: US 6,606,895 B2
(45) Date of Patent: Aug. 19, 2003

(54) METHOD OF MANUFACTURING A CROWN-SHAPED COMPONENT

(75) Inventors: Takahiro Sanada, Kashihara (JP); Yoshiro Sakai, Kyotanabe (JP); Narito Shimizu, Nagoya (JP); Jun Yatazawa, Toukai (JP); Shigeru Iwasa, Toukai (JP)

(73) Assignees: Koyo Seiko Co., Ltd. (JP); Daido Tokushuko Kabushiki Kaisha (JP)

( * ) Notice: Subject to any disclaimer, the term of this patent is extended or adjusted under 35 U.S.C. 154(b) by 26 days.

(21) Appl. No.: 09/956,430

(22) Filed: Sep. 20, 2001

(65) Prior Publication Data

US 2002/0073757 A1 Jun. 20, 2002

(30) Foreign Application Priority Data

Sep. 21, 2000 (JP) .................................. 2000-287592

(51) Int. Cl.$^7$ ............................................... B21K 21/12
(52) U.S. Cl. ..................... 72/334; 72/333; 72/342.94; 72/53
(58) Field of Search .......................... 72/334, 335, 332, 72/327, 356, 368, 53, 342.1, 342.94, 333

(56) References Cited

U.S. PATENT DOCUMENTS

| 3,168,843 A | * | 2/1965 | Cardinet ..................... 72/334 |
| 3,688,549 A | * | 9/1972 | Ohnishi et al. .............. 72/334 |
| 3,861,191 A | * | 1/1975 | Sato et al. .................. 72/334 |
| 4,167,864 A | * | 9/1979 | Taipale ....................... 72/53 |
| 4,299,112 A | * | 11/1981 | Kondo et al. ................. 72/334 |
| 4,694,676 A | * | 9/1987 | O'Brien ....................... 72/356 |
| 4,932,251 A | * | 6/1990 | Okada et al. ................. 72/334 |
| 5,595,613 A | | 1/1997 | Hatano et al. |
| 6,082,001 A | * | 7/2000 | Bettelini ..................... 72/335 |

FOREIGN PATENT DOCUMENTS

| EP | 420 136 A1 | | 4/1991 | |
| JP | 60238234 | | 11/1985 | |
| JP | 7-265387 | * | 10/1995 | ................... 72/334 |
| JP | 8-240493 | * | 9/1996 | ................... 72/334 |

* cited by examiner

Primary Examiner—Daniel C. Crane
(74) Attorney, Agent, or Firm—Bacon & Thomas, PLLC

(57) ABSTRACT

Described is a method of manufacturing a crown-shaped component 3 having a plurality of axially extending protrusions 2 which are formed at an end of a cylindrical portion 1. The method comprises the steps of: upsetting the cylindrical portion into a cylindrical blank 10a having protrusions arrayed on and along the inner circumferential surface of a remaining part 12; annealing the cylindrical blank; removing the remaining part by cutting; and subjecting the resultant blank to a shot blasting process, whereby a magnetic characteristic of the resultant crown-shaped component is improved.

9 Claims, 4 Drawing Sheets

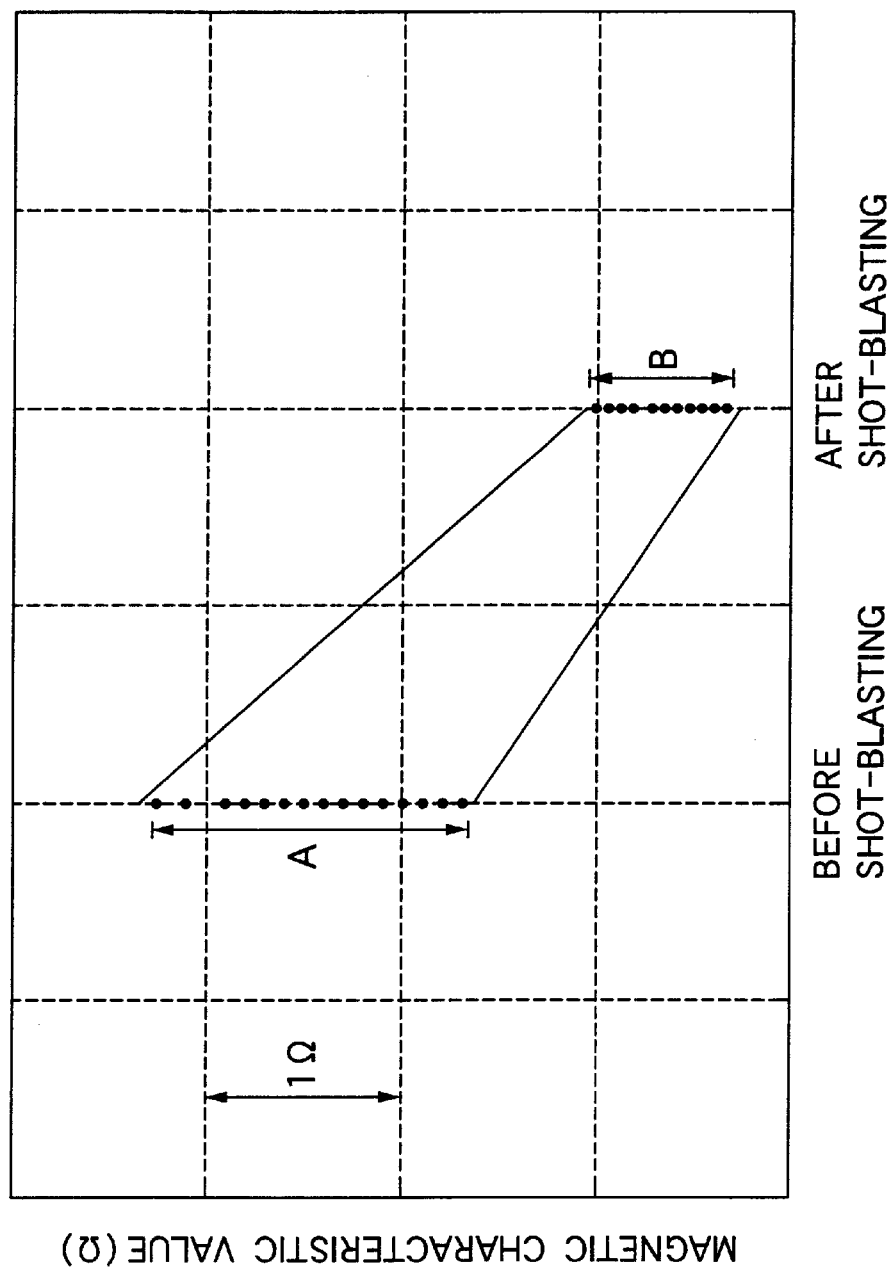

METHOD OF MANUFACTURING A CROWN-SHAPED COMPONENT

BACKGROUND OF THE INVENTION

The present invention relates to a method of manufacturing a crown-shaped component for a torque sensor. Particularly, the present invention relates to a method of manufacturing a crown-shaped component which has a plurality of axially extending protrusions that are formed at an end of a cylindrical portion thereof, by using forging, annealing, cutting, shot blasting and the like.

Conventionally, a torque sensor, which is attached to an electric power steering of a motor vehicle so as to detect a steering torque, is constructed as follows. An crown-shaped component 3 is set at a joint portion between the input and output components of a steering shaft, and a detecting coil is applied around them. The crown-shaped component 3 has a complicated shape, as shown in FIG. 1. The crown-shaped component 3 has a plurality of axially extending protrusions 2 which are formed at an end of a cylindrical portion 1 thereof.

In one of conventional manufacturing methods, the crown-shaped component 3 is manufactured by a powder sintering method in which powder of magnetic stainless steel is pressure-molded and sintered. In the other of conventional manufacturing methods for manufacturing the crown-shaped component, forging and cutting are utilized as disclosed in a Japanese Patent Unexamined Publication No. Hei.8-240493.

The conventional powder sintering method is disadvantageous in that since the product undergoes the complicated manufacturing process, the cost to manufacture is increased, and since perforations are easily formed in the product, a rigidity of the product becomes insufficient.

The conventional forging and cutting process also has disadvantages. The crown-shaped component, which is manufactured by the conventional forging and cutting process, inevitably suffers from the residual distortion and formation of burrs. Accordingly, a variation of the magnetic characteristic is great, and a high detection accuracy is not secured. This is a problem, because magnetic characteristic of the crown-shaped component greatly affects the sensing ability of the magnetic sensor.

SUMMARY OF THE INVENTION

Accordingly, an object of the present invention is to provide a method of manufacturing a crown-shaped component for a torque sensor, wherein the crown-shaped component has a stable magnetic characteristic. In addition to this, it is also an object of the present invention to provide a manufacturing method of such crown-shaped component with low cost.

The mentioned object can be achieved by, according to the present invention, a method of manufacturing a crown-shaped component having a plurality of axially extending protrusions which are formed at an end of a cylindrical portion thereof. The manufacturing method comprises the steps of:

upsetting and forming a cylindrical-shaped blank into a cylindrical-shaped member that includes a cylindrical portion, a plurality of protrusions formed at the top end of the cylindrical portion, an annular-shaped remaining part connected to the cylindrical portion, said protrusions being arrayed on and along the inner circumferential surface of the remaining;

annealing the thus upset and formed cylindrical-shaped member;

cutting and removing the remaining part from the thus annealed cylindrical-shaped member so as to form a crown-shaped member which is substantially coincided with the crown-shaped component in shape;

shot-blasting the crown-shaped member.

In the manufacturing method according to the present invention, it is preferable that the shot-blasting step comprises the step of:

dry shot blasting the crown-shaped member.

Further, in the above-mentioned manufacturing method according to the present invention, it is more preferable that the blowing pressure of the dry shot blasting is set to be in the range from 3 to 5 $kgf/cm^2$, and the blooming time thereof is set to be in the range of 10 to 30 seconds.

Moreover, the manufacturing method according to the present invention, it is advantageous that the upsetting and deforming step comprising the steps of:

upsetting the cylindrical-shaped blank into a first cylindrical-shaped member that includes a cylindrical basal portion, the protrusions protruding from the cylindrical basal portion in an axial direction thereof, and the remaining part that extends in a circumferential direction thereof and is connected to the cylindrical basal portion;

deep-drawing the thus upset first cylindrical-shaped member into a second cylindrical-shaped member that includes the plurality of protrusions, the remaining part and a cylindrical basal portion that has a bottom part and a C-shaped cross-section;

punching and removing the bottom part of the thus deep-drawn second cylindrical-shaped member so as to form a third cylindrical-shaped member that includes the plurality of protrusions, the remaining part and a cylindrical basal hollow-portion as the cylindrical portion.

BRIEF DESCRIPTION OF THE DRAWINGS

FIG. 5 is a graph showing a variation of a magnetic characteristic of the crown-shaped component having undergone the shot blasting.

DETAILED DESCRIPTION OF THE PREFERRED EMBODIMENTS

Figure 1:
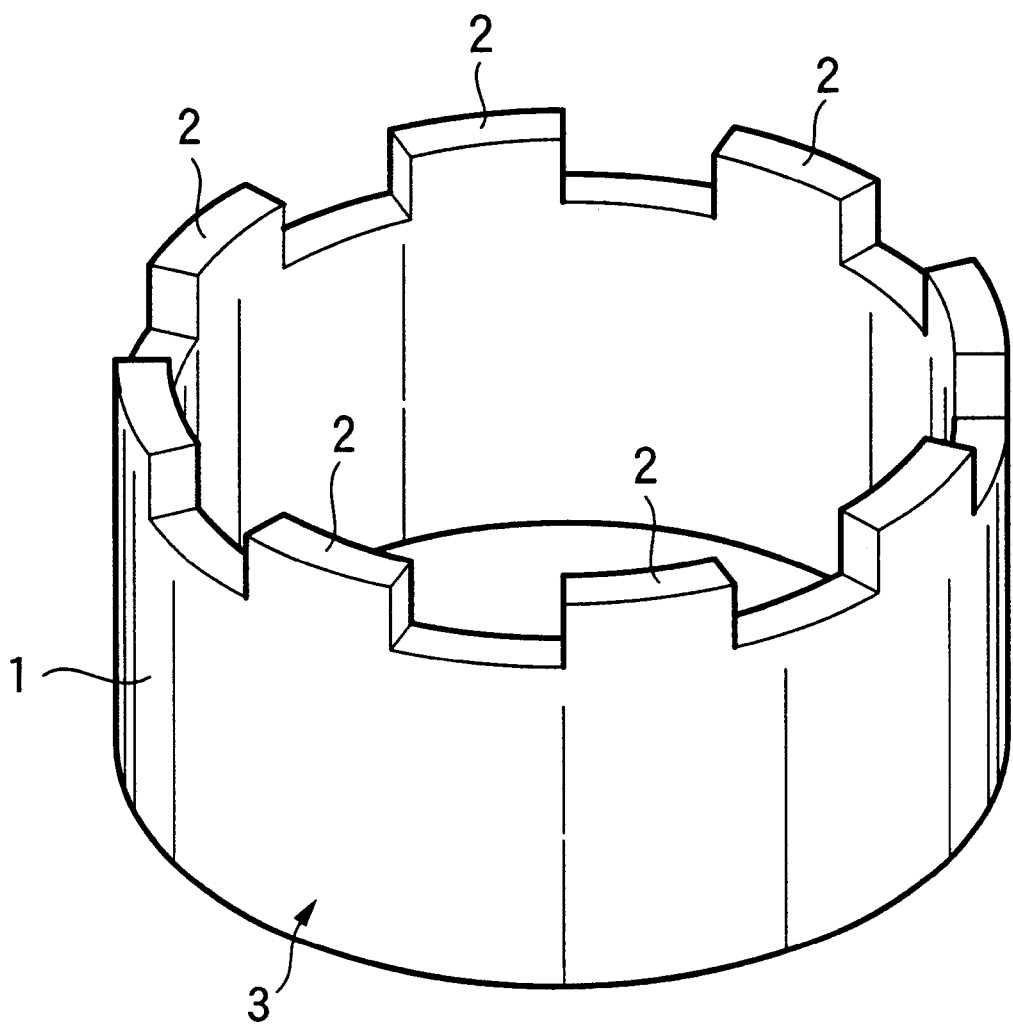
FIG. 1 is a perspective view showing a crown-shaped component for a torque sensor, which is constructed according to the present invention.

The preferred embodiment of the present invention will be hereinafter described. In the invention, a cylindrical blank is subjected to a forging process, an annealing process, a cutting process, and a shot blasting process, whereby a crown-shaped component is manufactured. Table 1 shows a composition of the blank.

TABLE 1

| C | Si | Mn | P | S | Cr | Ni |
|---|---|---|---|---|---|---|
| ≦0.03 | ≦1.5 | ≦0.3 | ≦0.04 | ≦0.03 | 11.5~13.5 | ≦0.6 | wet %: remaining part consists substantially of Fe
~: "~" means a ranges therebetween with both inclusive The forging process will first be described. FIGS. 2A to 2D show a deformation of a cylindrical-shaped solid blank 10a when it is successively deformed by cold forging process.

In a first step (FIG. 2B), parts 11 which will become protrusions 2 of the crown-shaped component are forged while remaining its peripheral part 12, whereby the blank 10a is deformed into a deformed cylindrical member 10b. Namely, the blank 10a is subject to a upset-forgings wherein the blank 10a is set a forging die apparatus that is defined by a punch 20 and a forging die 30 to be loosely fit to the punch. The punch 20 has, at the outer peripheral position of the tip end portion, protrusions/recesses 21 that defines and corresponds the protrusions of the deformed cylindrical member 10b. In other words, the punch 20 having the protrusions/recesses 21 is used for forming the parts 11 to be the protrusions 2 in the complete product shown in FIG. 1.

The forming of the remaining part 12 has an advantages that the material flow at the time of forging becomes smooth. Accordingly, the parts 11 corresponding to the protrusions 2 may be formed by only the first step. It is free from the adverse effect by the process hardening when this complicated configuration is formed in a second step shown in FIG. 2C and the subsequent ones.

Then, in the second step, a bottom part 13 is formed at a deep part of the cylindrical member 10c by a predetermined forging die, through a deep drawing method.

Figure 2A:
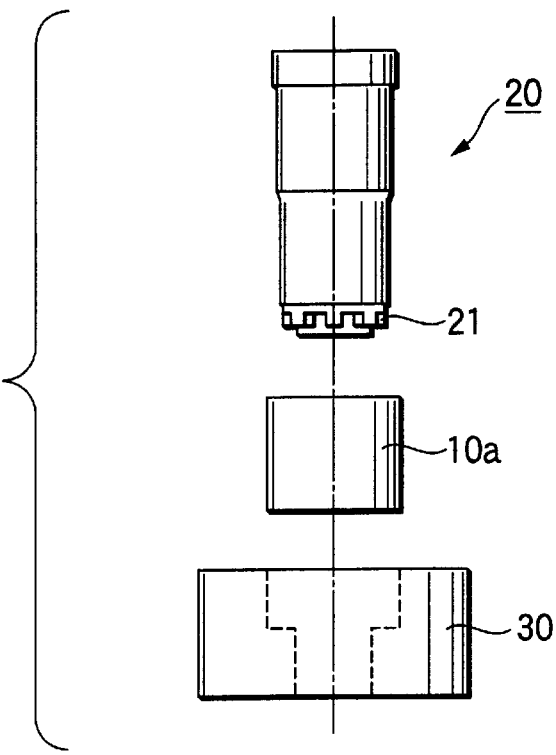
FIGS. 2A–2D are diagrams showing a sequence of forging process steps of the crown-shaped component.
Figure 2B:
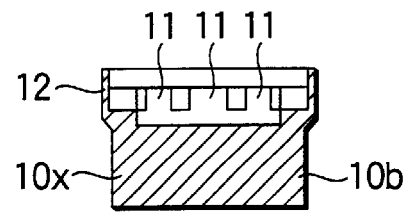
Figure 2C:
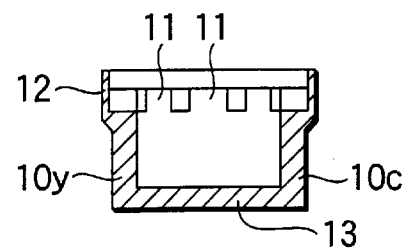
Figure 2D:
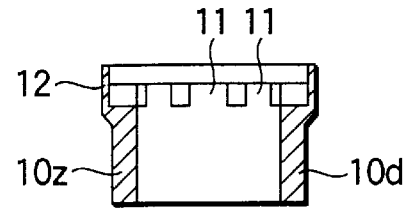

In a third step shown in FIG. 2D, the bottom part 13 is removed by punching to form a cylindrical member 10d.

Then, the cylindrical member 10d is placed in a furnace and heated to 700 to 800° C. to lessen a residual distortion in the cylindrical member 10d by annealing. The thus annealed cylindrical member 10d is set to a cutting machine, e.g., lathe, and the remaining part 12 is cut out. The cutting process forms the protrusions 2 completed as shown in FIG. 1. As the result of the cutting, burrs are formed at the corners of the protrusions 2. Those burrs will be removed in the subsequent shot blasting process.

Figure 3:
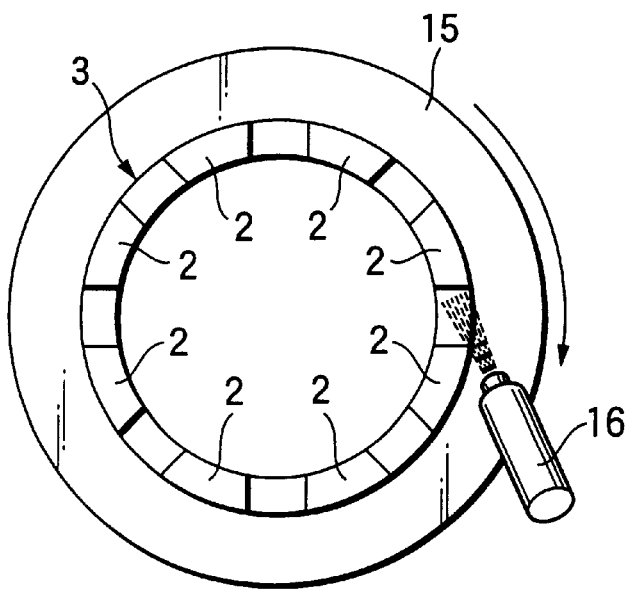
FIG. 3 is a plan view showing a shot blasting process for forming the crown-shaped component.
Figure 4:
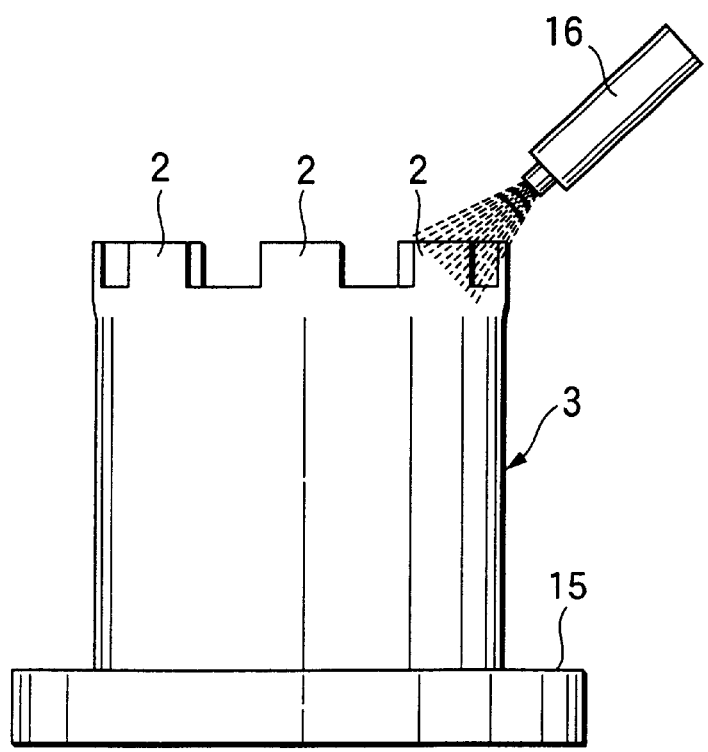
FIG. 4 is a side view showing the shot blasting process of FIG. 3.

A dry shot blasting in which shot particles, e.g., glass beads or hard plastic particles are blown against the workpiece by utilizing compressed air, is employed in the shot blasting process. Specifically, as shown in FIGS. 3 and 4, the crown-shaped component 3 is fixed on a turntable 15. The turntable is turned in the direction of an arrow. A shotgun 16 is set while being inclined at an angle 45° with respect to the turntable so that the shotgun blows the particles to the crown-shaped component, from the upper part. In this case, the blowing pressure is approximately 3 to 5 kgf/cm$^2$, and the blowing time is 10 to 30 seconds. The burrs were completely removed by the shot blasting process.

As mentioned above, the embodiment of the present invention can be summarized as follows.

That is, a method of manufacturing a crown-shaped component, according to the embodiment of the present invention comprising the steps of:

upsetting and deforming a cylindrical-shaped solid blank 10a into a first cylindrical-shaped member 10b that includes a cylindrical basal portion 10x, a plurality of protrusions 11 protruding from the cylindrical basal portion 10x in an axial direction thereof, and a remaining part 12 that extends in a circumferential direction thereof and is connected to the cylindrical basal portion, the plurality of protrusions being arrayed on and along an inner circumferential surface the remaining part;

deep-drawing the thus upset and deformed first cylindrical-shaped member 10b into a second cylindrical-shaped member 10c that includes the plurality of protrusions 11, the remaining part 12 and a cylindrical basal portion 10y having a bottom part 13 and a C-shaped cross-section;

punching and removing the bottom part of the thus deep-drawn second cylindrical-shaped member 10c so as to form a third cylindrical-shaped member 10d that includes the plurality of protrusions 11, the remaining part 12 and a cylindrical basal hollow-portion 10z;

annealing the third cylindrical-shaped member 10c;

cutting and removing the remaining part from the thus annealed third cylindrical-shaped member 10c so as to form a fourth cylindrical-shaped member which is substantially coincided with the crown-shaped component in shape; and shot-blasting the fourth cylindrical-shaped member.

A test was conducted to confirm an improvement of a magnetic characteristic of the crown-shaped component by the shot blasting. The test result is shown in FIG. 5. In the test, the magnetic characteristics of fifteen crown-shaped components were measured by an LCR meter. In the graph, the abscissa represents two types of the crown-shaped components before and after the shot blasting, and the ordinate represents magnetic characteristic value. The data shows that a variation of the magnetic characteristic after the shot blasting is 0.5Ω, and it is reduced about 30% since the variation before the shot blasting is 1.6Ω. Thus, the variation of the magnetic characteristic is remarkably improved after the shot blasting.

As seen from the foregoing description, according to a method of manufacturing the crown-shaped component for a torque sensor, the burrs of the crown-shaped component is removed and further a variation of the magnetic characteristic of it is considerably reduced since the forging and cutting, and further the annealing and shot blasting are used. As a result, the sensing ability of the torque sensor is improved to provide a high accuracy of sensing. Additionally, the manufacturing cost is reduced and a mass production of the crown-shaped components is realized.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A method of manufacturing a crown-shaped component having a generally stable magnetic characteristic and being suitable for use as a torque sensor, said manufacturing method comprises the steps of:

upsetting and deforming a cylindrical-shaped blank into a cylindrical-shaped member that includes a cylindrical portion, a plurality of protrusions formed at the top end of the cylindrical portion, an annular-shaped remaining part connected to the cylindrical portion, said protrusions being arrayed on and along the inner circumferential surface of the remaining part;

annealing the upset and deformed cylindrical-shaped member;

cutting and removing the remaining part from the annealed cylindrical-shaped member so as to form a crown-shaped member which is substantially coincided with the crown-shaped component in shape; shot-blasting the crown-shaped member.

2. The manufacturing method according to claim 1, wherein said shot-blasting step comprises the step of:

dry shot-blasting the crown-shaped member.

3. The manufacturing method according to claim 1, wherein the blowing pressure of the dry shot-blasting is set to be in the range from 3 to 5 kgf/cm$^2$, and the blowing time thereof is set to be in the range of 10 to 30 seconds.

4. The manufacturing method according to claim 1, wherein said upsetting and deforming step comprising the steps of:

upsetting said cylindrical-shaped blank into a first cylindrical-shaped member that includes a cylindrical basal portion, said protrusions protruding from said cylindrical basal portion in an axial direction thereof, and said remaining part that extends in a circumferential direction thereof and is connected to said cylindrical basal portion;

deep-drawing the thus upset first cylindrical-shaped member into a second cylindrical-shaped member that includes said plurality of protrusions, said remaining part and a cylindrical basal portion that has a bottom part and a C-shaped cross-section;

punching and removing the bottom part of the thus deep-drawn second cylindrical-shaped member so as to form a third cylindrical-shaped member that includes said plurality of protrusions, said remaining part and a cylindrical basal hollow-portion as said cylindrical portion.

5. The manufacturing method according to claim 4, wherein said annealing step comprises the step of:

annealing the third cylindrical-shaped member.

6. The manufacturing method according to claim 5, wherein said cutting and removing step comprises the step of:

cutting and removing said remaining part from the thus annealed third cylindrical-shaped member so as to form a fourth cylindrical-shaped member which is substantially coincided with said crown-shaped component in shape.

7. The manufacturing method according to claim 6, wherein said shot-blasting step comprises the step of:

dry shot-blasting said fourth cylindrical-shaped is member.

8. The manufacturing method according to claim 1, wherein the step of said shot-blasting comprises the step of dry shot-blasting said crown-shaped member.

9. The manufacturing method according to claim 8, wherein the blowing pressure of the dry shot blasting is set to be in the range from 3 to 5 kgf/cm$^2$, and the blowing time thereof is set to be in the range of 10 to 30 seconds.

* * * * *